(12) United States Patent
Kmec et al.

(10) Patent No.: US 6,503,400 B2
(45) Date of Patent: Jan. 7, 2003

(54) PHOSPHATE STABILIZING COMPOSITIONS

(75) Inventors: Pavol Kmec, Hamburg, NJ (US); Dwight E. Emerich, Lincoln Park, NJ (US)

(73) Assignee: Ashland Inc., Dublin, OH (US)

( * ) Notice: Subject to any disclaimer, the term of this patent is extended or adjusted under 35 U.S.C. 154(b) by 45 days.

(21) Appl. No.: 09/737,534

(22) Filed: Dec. 15, 2000

(65) Prior Publication Data

US 2002/0115799 A1 Aug. 22, 2002

(51) Int. Cl.$^7$ ................................................. C02F 5/12

(52) U.S. Cl. ........................ 210/696; 210/200; 252/175; 252/180; 510/247; 525/178

(58) Field of Search ................................ 252/175, 130; 210/676, 700; 525/173; 510/247

(56) References Cited

U.S. PATENT DOCUMENTS

| 5,152,902 A | | 10/1992 | Koskan et al. ............ 210/698 |
|---|---|---|---|
| 5,386,038 A | | 1/1995 | Davis et al. .............. 549/262 |
| 5,523,023 A | | 6/1996 | Kleinstuck et al. ........ 252/542 |
| 5,525,257 A | * | 6/1996 | Kleinstuck et al. ........ 210/698 |
| 5,658,993 A | * | 8/1997 | Denzinger et al. ......... 525/285 |
| 5,747,635 A | | 5/1998 | Kroner et al. ............ 528/328 |
| 6,207,079 B1 | | 3/2001 | Kmec et al. ............ 252/389.2 |
| 6,277,302 B1 | * | 8/2001 | Fan et al. ............. 252/389.52 |

* cited by examiner

Primary Examiner—Robert Dawson
Assistant Examiner—Marc S Zimmer
(74) Attorney, Agent, or Firm—David L. Hedden

(57) ABSTRACT

This invention relates to phosphate stabilizing compositions comprising (a) polyaspartic acid, and (b) an anionic carboxylic polymer. The compositions effectively stabilize phosphates by inhibiting the formation of calcium phosphate scale. The invention also relates to a process for inhibiting calcium phosphate scale in water treatment systems.

9 Claims, No Drawings

PHOSPHATE STABILIZING COMPOSITIONS

CROSS-REFERENCE TO RELATED APPLICATIONS

Not Applicable.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION

1. Field of the Invention

This invention relates to phosphate stabilizing compositions comprising (a) polyaspartic acid, and (b) an anionic carboxylic polymer. The compositions effectively stabilize phosphates by inhibiting the formation of calcium phosphate scale. The invention also relates to a process for inhibiting calcium phosphate scale in water treatment systems.

2. Description of the Related Art

It is known to treat cooling water and many industrial waters with inorganic and organic phosphorous-containing compounds to prevent anodic corrosion. Typically used for this purpose are water-soluble phosphates such as ammonium and/or alkali metal phosphates, where the phosphates can be ortho-, meta- or pyrophosphates, particularly orthophosphates. Polyphosphates can likewise be employed because they are hydrolyzed to orthophosphates in aqueous medium.

The problem with using phosphates in water treatment is that they tend to produce calcium phosphate scales, which adhere to the metal surfaces of boilers and metallic heat exchangers. The scale inhibits effective heat transfer, restricts the flow of the water, and promotes the development of underdeposit corrosion. Consequently, it is necessary to remove the scale by cleaning. Such cleaning is expensive because equipment must be shutdown, labor costs are incurred, and production is delayed. In view of these problems, preventing scale formation is preferred to scale removal.

It is well known that phosphates can be effectively stabilized with anionic carboxylic polymers alone, or even more effectively with the blends of these polymers and organic phosphonates. See for example U.S. Pat. No. 4,584,105. Although these polymers are effective against a variety of scales, they are not always entirely effective against calcium phosphate scales and are costly to use.

It is also known to use phosphonates for calcium carbonate scale control and/or to enhance corrosion inhibition. For scale inhibition, the dosage of the phosphonate is typically in the order of 0.5–5 ppm, while for corrosion inhibition, in the order of 5–8 ppm. However, the use of phosphonates for these purposes is not desirable from an environmental or economic standpoint.

U.S. Pat. No. 5,152,902 discloses that polyaspartic acids inhibit calcium phosphate crystallization. However, no data is given in the patent, and it is known that polyaspartic acid is very weak phosphate scale inhibitor, if it does so at all, and it is necessary to lower the pH to provide calcium phosphate stabilization. For all practical purposes, polyaspartic acid has nearly zero efficacy against calcium phosphate scales.

U.S. Pat. No. 5,523,023 relates to compositions comprising polyaspartic acid and phosphonobutane tricarboxylic acid, which are used for alkaline cleaners. U.S. Pat. 5,386,038 discloses a water-soluble mixture of phosphonated oligomers that inhibit scale formation and/or the corrosion of metal exposed to aqueous systems. WO 00/44677 teaches that certain blends of polyaspartic acid and certain water-soluble mixture of phosphonated oligomers effectively inhibit the formation of calcium carbonate scale and are also effective corrosion inhibitors.

All citations referred to under this description of the "Related Art" and in the "Detailed Description of the Invention" are expressly incorporated by reference.

BRIEF SUMMARY OF THE INVENTION

This invention relates to phosphate stabilizing compositions comprising (a) polyaspartic acid, and (b) an anionic carboxylic polymer. The compositions effectively stabilize phosphates by inhibiting the formation of calcium phosphate scale. The invention also relates to a process stabilizing phosphates from forming calcium phosphate scale in water treatment systems. The compositions provide synergistic phosphate stabilization in cooling waters, which is preferably accomplished without the use of a phosphonate or phosphonate oligomer.

The compositions are synergistic because, although polyaspartic acids are not effective phosphate stabilizers, blending polyaspartic acid with known polymer phosphate inhibitors improves the performance of known phosphate stabilizers. This was surprising because polyaspartic acid alone does not have any significant phosphate stabilizing effect. The mixtures stabilize phosphates more than was expected in view of the phosphate inhibition activity of the individual components. Although carboxylic polymers alone provide some phosphate stabilization, they are not biodegradeable and are expensive to use. On the other hand, polyaspartic acid is biodegradeable, less expensive, and inhibits corrosion.

The process is particular useful for treating aqueous systems containing a phosphate where the pH of the aqueous system is from about 8.0 to about 9.3.

Although not necessary or preferred, a water-soluble phosphonated oligomer having the general formula can be added to the composition:

$$H[CHRCHR]_n-PO_3M_2$$

wherein at least one R group in each unit is a COOM, $CH_2OH$, sulphono, or phosphono group and the other R group which may be the same as, or different from, the first R group, is hydrogen or a COOM, hydroxyl, phosphono sulphono, sulphato, $C_{1-7}$ alkyl, $C_{1-7}$ alkenyl group or a carboxylate, phosphono, sulphono, sulphato, and/or hydroxy substituted $C_{1-7}$ alkyl or $C_{1-7}$ alkenyl group, and each M is a cation such that the phosphonated oligomer is water soluble and n is 1 to 6, typically >1 and <6. These water-soluble phosphonated oligomers are typically added to the composition to inhibit calcium carbonate scale formation and/or corrosion. However, the amount of water-soluble phosphonate oligomer used in the compositions of this invention is such that the weight ratio of water-soluble phosphonate oligomer to polyaspartic acid is <1:1 or greater than 1:9.

BRIEF DESCRIPTION OF THE SEVERAL VIEWS OF THE DRAWINGS

Not Applicable.

DETAILED DESCRIPTION OF THE INVENTION

The detailed description and examples will illustrate specific embodiments of the invention will enable one skilled in the art to practice the invention, including the best mode. It is contemplated that many equivalent embodiments of the invention will be operable besides these specifically disclosed. All units are in the metric system and all percentages are percentages by weight unless otherwise specified.

Component (a) of the scale inhibitor composition is a water soluble polyaspartic acid. For purposes of this invention, the term "polyaspartic acid" shall be construed to include salts and derivatives of polyaspartic acid. Polyaspartic acid, salts thereof, and derivatives of polyaspartic acid are well known and are described in U.S. Pat. No. 5,523,023 which is hereby incorporated by reference. Preferably used is polyaspartic acid having an average molecular weight, according to gel-permeation chromatographic analysis, from 500 to 10,000, preferably 1,000 to 5,000, most preferably 2,000 to 4,000. The polyaspartic acid is preferably used as a salt, in particular as a sodium salt or potassium salt. Whether polyaspartic acid is used in the form of an acid or a salt depends upon the pH of the aqueous system treated. Preferably, the salts of polyaspartic acid are sodium salts. Derivatives of polyaspartic acid, for example anhydrides of polyaspartic acid, which can convert to polyaspartic acid by hydrolysis under use conditions, also can be used.

Component (b) is an anionic carboxylic polymer or a salt thereof that stabilizes phosphates against precipitation in an aqueous system. For purposes of describing this invention, polymer shall be construed to mean any product formed by the polymerization of one or monomers, and includes homopolymers, copolymers, terpolymer, tetrapolymers, etc. The anionic carboxylic polymer preferably has some stabilizing effect against the formation of calcium phosphate scale when used alone. The anionic carboxylic polymer typically has an average molecular weight of 1,000 to 50,000 as determined by gel-permeation chromatographic analysis, preferably from 2,000 to 10,000. These polymers and their method of synthesis are well known in the art.

Examples of monomers that can provide the source for the carboxylic functionality for the anionic carboxylic polymer include acrylic acid, maleic acid, methacrylic acid, crotonic acid, isocrotonic acid, fumaric and itaconic acid.

Numerous co-monomers can be polymerized with the monomer that is the source of the carboxylic functionality. Examples such monomer included vinyl, allyl, acrylamide, (meth) acrylate esters or hydroxy esters e.g. hydroxypropyl esters, vinyl pyrrolidone, vinyl acetate, acrylonitrile, vinyl methyl ether, 2-acrylamido-2-methyl-propane sulphonic acid, vinyl or allyl sulphonic acid and styrene sulphonic acid. The molar ratio of carboxylic functional monomer to other monomer varies over wide ranges, e.g. from 99:1 to 1:99, but more typically from 95:5 to 25:75.

Examples of hydrolyzed or partially hydrolyzed acrylamides/acrylates are disclosed in U.S. Pat. No. 4,001, 161. Preferably used as the hydrolyzed or partially hydrolyzed acrylamides/acrylates are low molecular weight soluble polymers having average molecular weight of 500–10,000, most preferably from 2000–6000. Example of commercially available water-soluble hydrolyzed or partially hydrolyzed acrylamide/acrylates polymers is Cyanamer P-70 from Cytec Industries sold as a 50% aqueous solution.

The sulfonated styrene/maleic anhydride copolymers are high molecular weight water-soluble polymers typically having average molecular weight from 1,000 to 70,000, preferably from 15,000 to 70,000. Examples of sulfonated styrene/maleic anhydride copolymers are shown in U.S. Pat. Nos. 4,255,259 and 4,306,991. Examples of commercially available water-soluble sulfonated styrene/maleic anhydride copolymers are Versa TL-4 sold as a 25% aqueous solution, and Versa TL-3 sold as 95% solids, available from Alco Chemical.

It is also possible to employ carboxylic acid polymers that contain a chain phosphorus atom, which forms part of an acid group, preferably phosphino polycarboxylic acids. For a description of such polymers, see, for example, U.S. Pat. No. 4,692,317 and U.S. Pat. No. 2,957,931. The molecular weight of such polymers is relatively low, generally below 6,000, the preferred molecular weight being from 500 to 6000. A particularly suitable polymer is that sold as Belclene 500, and DP-3385 sold as a 40% aqueous solution and Belsperse 161 sold as a 50% aqueous solution, which are available from Biolab.

The effective ratio of carboxylic polymer to polyaspartic acid is from about 1:9 to about 9:1, with the best synergistic efficacy from 1:4 to 2:1. The compositions are effective at a pH range of 7.0 to 9.2, preferably at a pH range of 8.0 to 8.9, and most preferably at a pH range of 8.2 to 8.6 at temperatures of 5° C. to 98° C. The phosphate stabilizing compositions are used at the minimum dosage of 0.1 ppm to the maximum of 500.0 ppm, but preferably 1.0 ppm to 20.0 ppm actives.

Other optional components include phosphonobutane tricarboxylic acid, tolyltriazole, orthophosphate, polyphosphates, phosphates, hydroxyethylidene diphosphonic acid, amino tri (methylene phosphonic acid).

EXAMPLES

While the invention has been described with reference to a preferred embodiment, those skilled in the art will understand that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. In this application, all units are in the metric system and all amounts and percentages are by weight, unless otherwise expressly indicated.

ABBREVIATIONS AND TRADE NAMES

The following abbreviations are used:

| ABBREVIATIONS AND TRADE NAMES | |
|---|---|
| The following abbreviations are used: | |
| Acumer 3100 | acrylic copolymer copolymer sold by Rohm & Haas under the Accumer trademark. |
| AA:AMPS | [acrylic]: [ methacrylic acid and 2-acrylamido-2-methyl propane sulfonic acid] copolymer. |
| AR-540 | sulfonated acrylic acid copolymer sold by Alco Chemical sold under the AQUATREAT trademark. |
| AR-545 | AA:AMPS copolymer sold by Alco Chemical sold under the AQUATREAT trademark. |
| AR MPS | sulfonated acrylic copolymer sold by Alco Chemical sold under the AQUATREAT trademark |
| Belclene 283 | maleic/ethylacrylate/vinyl acetate copolymer sold by Biolab. |
| Belclene 400 | phosphinocarboxylic acid copolymer sold by Biolab. |
| Cyanamer P-70 | acrylamide acrylate copolymer sold by Cytec Industries under the trademark Cyanamer. |
| K-797 | acrylic/AMPS)/sulfonated styrene copolymer sold by B. F. Goodrich under the Good-Rite trademark. |
| KXP-123 | acrylic/ethoxylate/acrylamide copolymer sold by B. F. Goodrich under the Good-Rite trademark. |
| PAA | polyaspartic acid known as VP OC 2401 sold by Bayer. |

Examples 1 through 4 demonstrate the synergy for the phosphate stabilization. All amounts are in ppm solids, unless otherwise indicated. The same test method used in the examples is described as follows:

TEST METHOD

Test water was first prepared having, an initial pH of 8.0, initial calcium content of 200 ppm (as $CaCO_3$), and initial orthophosphate content of 10.0 ppm (as $PO_4^{3-}$), hereinafter referred to as the Control. A container containing the test water was placed on a New Brunswick G-24 Environmental Incubator shaker at 250 rpm at 50° C. for 16 hours. The test water was then filtered with a Whatman #5 filter; the residual orthophosphate in the filtrate was determined; and the percentage orthophosphate was calculated. The calculation was carried out as follows:

% $PO_4^{3-}$ inhibition=$(R_x-R_o)/(R_i-R_o)100$, where $R_x$=residual ppm $PO_4^{3-}$ of sample x, $R_o$=residual ppm $PO_4^{3-}$ of the Control and $R_i$=initial ppm $PO_4^{3-}$ (10.0 ppm).

A higher % $PO_4^{3-}$ inhibition indicates that the test compound is more effective at stabilizing phosphates from precipitating as calcium phosphate scale in aqueous systems. The data in Table I show the effect of adding PAA alone to the Control at various concentrations to stabilize phosphates from forming calcium phosphate scale.

TABLE I (% $PO_4^{3-}$ inhibition/stabilization for PAA alone)

| PAA (ppm solids) | % $PO_4^{3-}$ inhibition ± STD |
|---|---|
| 5.0 | 0.0 |
| 7.5 | 0.0 |
| 10.0 | 0.0 |
| 12.5 | 0.0 |
| 15.0 | 0.0 |
| 20.0 | 0.0 |

The data in Table I indicate that PAA alone does not act as a stabilizer against the formation of calcium phosphate scale.

The data in Tables II–III show the effectiveness of certain phosphate stabilizers when used alone. They also show the effect of adding PAA to these known phosphate stabilizers.

The "synergistic difference", as listed in the last column, is equal to the difference between the % inhibition of the blend and the % inhibition of the individual phosphate inhibitors. This synergistic difference is a measure of the improved efficacy obtained by blending PAA with the known phosphate stabilizer.

TABLE II (Addition of PAA to AR-545 at various ratios)

| Example | AR-545 (ppm solids) | PAA (ppm solids) | Ratio of solids | Total solids | % $PO_4^{3-}$ inhibition | Synergistic Difference |
|---|---|---|---|---|---|---|
| A | 4 | 0 | 4:0 | 0 | 0 | NA |
| 1 | 4 | 16 | 1:4 | 20 | 4.5 ± 0.0 | 4.5 |
| 2 | 5 | 15 | 1:3 | 20 | 14.1 ± 0.5 | 11.5 |
| 3 | 6 | 14 | 1:2.3 | 20 | 92.6 ± 0.5 | 90.4 |
| 4 | 5 | 10 | 1:2 | 15 | 5.9 ± 0.5 | 3.3 |
| 5 | 10 | 10 | 1:1 | 20 | 89.6 ± 2.6 | 77.5 |

The data in Table II indicate that the addition of PAA to AR-545 improves the phosphate stabilizing effect of AR-545 at various ratios.

EXAMPLE 6

The procedure for Examples 1–5 was followed except AR-540 was used as the anionic polymer. The results are set forth in Table III.

TABLE III (Synergistic blends of AR-540 with PAA)

| Example | AR-540 (ppm solids) | PAA (ppm solids) | Ratio of solids | Total solids | % $PO_4^{3-}$ inhibition | Synergistic Difference |
|---|---|---|---|---|---|---|
| B | 5 | 0 | 0 | 5 | 6.3 ± 1.5 | NA |
| 6 | 5 | 10 | 1:2 | 15 | 14.9 ± 1.8 | 8.6 |
| 7 | 10 | 10 | 1:1 | 20 | 91.3 ± 2.1 | +12.1 |
| C | 7.5 | 0 | 0 | 7.5 | 17.4 ± 2.6 | NA |
| 8 | 7.5 | 7.5 | 1:1 | 15 | 84.4 ± 1.5 | +67.0 |

The data in Table III show similar results when using AR-540. PAA alone does not have any effect, but when combined with AR-540, it enhances the effectiveness of the AR-540.

The data in Table IV compare phosphate stabilization for known polymeric phosphate stabilizers to blends of these stabilizers with PAA at a 1:1 ratio.

TABLE IV (Inhibiting Effect of Known Phosphate Stabilizers Compared to Blends Containing PAA at a 1:1 ratio)

| Example | Inhibitor | Inhibitor amount (ppm solids) | PAA (ppm solids) | % $PO_4^{3-}$ inhibition | Synergistic Difference |
|---|---|---|---|---|---|
| D | Versa TL-4 | 10 | 0 | 7.8 ± 2.4 | NA |
| 9 | Versa TL-4 | 10 | 10 | 82.5 ± 5.0 | 74.7 |
| E | GR K-797 | 7.5 | 0 | 6.9 ± 1.6 | NA |
| 10 | GR K-797 | 7.5 | 7.5 | 84.0 ± 1.9 | 77.1 |

TABLE IV-continued (Inhibiting Effect of Known Phosphate Stabilizers Compared to
Blends Containing PAA at a 1:1 ratio)

| Example | Inhibitor | Inhibitor amount (ppm solids) | PAA (ppm solids) | % $PO_4^{3-}$ inhibition | Synergistic Difference |
|---|---|---|---|---|---|
| F | KXP-123 | 7.5 | 0 | 3.8 ± 1.4 | NA |
| 11 | KXP-123 | 7.5 | 7.5 | 83.6 ± | 79.8 |
| G | Acumer 3100 | 7.5 | 0 | 66.7 ± 6.5 | NA |
| 12 | Acumer 3100 | 7.5 | 7.5 | 88.5 ± 2.1 | 21.8 |
| H | Belclene 400 | 7.5 | 0 | 8.5 ± 2.3 | NA |
| 13 | Belclene 400 | 7.5 | 7.5 | 34.8 ± 6.9 | 26.3 |
| I | Belclene 283 | 20 | 0 | 5.6 ± ⅙ | NA |
| 14 | Belclene 283 | 20 | 20 | 28.5 ± 3.7 | 22.9 |
| J | Cyanamer P-70 | 20 | 0 | 0 | NA |
| 15 | Cyanamer P-70 | 10 | 10 | 25.8 ± 1.8 | 25.8 |
| K | Aquatreat MPS | 7.5 | 0 | 5.9 ± 1.4 | NA |
| 16 | Aquatreat MPS | 7.5 | 7.5 | 84.0 ± 1.0 | 78.1 |

The data in Table III indicate that the addition of PAA to a variety of known phosphate stabilizers improves the ability of these phosphate stabilizers when the used in a weight ratio of 1:1.

What is claimed is:

1. A method for inhibiting the formation of phosphate precipitation and deposits in an aqueous system which comprises:
    introducing a phosphate stabilizing composition comprising:
        (a) polyaspartic acid, and
        (b) an anionic carboxylic polymer,
    such that the composition is free of a water-soluble phosphonate oligomer, into an aqueous system containing a phosphate corrosion inhibitor, in an amount effective to inhibit the formation of phosphate precipitation, wherein the pH of the aqueous system is from about 8.0 to about 9.3.

2. The process of claim 1 wherein the weight ratio of solids of (a) to (b) of the phosphate stabilizing composition is from about 1:9 to about 9:1.

3. The process of claim 2 wherein the anionic carboxylic copolymer of the phosphate stabilizing composition has an average molecular weight from 500 to 20,000.

4. The process of claim 3 wherein carboxylic polymer of the phosphate stabilizing composition is selected from the group consisting of acrylic/sulfonic polymers, acrylic/maleic copolymers, phosphinocarboxylic, acrylic/maleic/sulfonated styrene, acrylic/ethoxylate/acrylamide, maleic/ethylacrylate/vinyl acetate and mixtures thereof.

5. The process of claim 4 wherein carboxylic polymer of the phosphate stabilizing composition is an acrylic/sulfonic copolymer having a mole ratio of acrylic to sulfonic of 98:2 to 20:80.

6. The process of claim 5 wherein the polyaspartic acid of the phosphate stabilizing composition has average molecular weight from 1000 to 10 000 and the ratio of (a) to (b) is from 4:1 to 1:2.

7. The method of claim 6 wherein said composition is used in concentrations from 1.0 to 20.0 ppm.

8. The process of claim 6 wherein the phosphate stabilizing composition comprises at least one additional component, selected from the group consisting of tolyltriazole, benzotriazole, phosphonates, molybdates, zinc, orthophosphate, and polyphosphates.

9. The method of claim 2 wherein said composition is used in concentrations from 0.1 ppm to 500 ppm.

* * * * *